US009322141B2

(12) United States Patent
Tykalsky

(10) Patent No.: US 9,322,141 B2
(45) Date of Patent: Apr. 26, 2016

(54) MOLDBOARD UTILITY SYSTEM

(71) Applicant: Nicolai Tykalsky, Anchorage, AK (US)

(72) Inventor: Nicolai Tykalsky, Anchorage, AK (US)

(*) Notice: Subject to any disclaimer, the term of this patent is extended or adjusted under 35 U.S.C. 154(b) by 0 days.

(21) Appl. No.: 14/176,776

(22) Filed: Feb. 10, 2014

(65) Prior Publication Data

US 2015/0225914 A1 Aug. 13, 2015

(51) Int. Cl.
E01H 5/06 (2006.01)
(52) U.S. Cl.
CPC .................................... E01H 5/066 (2013.01)
(58) Field of Classification Search
USPC .................................................... 37/266, 407
IPC .................................. E01H 5/065; B60Q 1/18
See application file for complete search history.

(56) References Cited

U.S. PATENT DOCUMENTS

| 3,934,134 | A | * | 1/1976 | Wassel | 362/549 |
|---|---|---|---|---|---|
| 5,420,480 | A | | 5/1995 | Knepel et al. | |
| 6,005,300 | A | | 12/1999 | Kelly | |
| 6,138,388 | A | * | 10/2000 | Kost et al. | 37/231 |
| 6,154,122 | A | * | 11/2000 | Menze | 340/425.5 |
| 6,256,909 | B1 | * | 7/2001 | Kost et al. | 37/231 |
| 6,323,759 | B1 | * | 11/2001 | Menze | 340/425.5 |
| 6,362,727 | B1 | | 3/2002 | Guy, Jr. | |
| 6,371,633 | B1 | * | 4/2002 | Davis | 362/459 |
| 6,393,737 | B2 | * | 5/2002 | Quenzi et al. | 37/231 |
| 6,409,367 | B1 | * | 6/2002 | Pratt | 362/505 |
| 6,484,421 | B1 | * | 11/2002 | Donoghue | 37/231 |
| 7,410,281 | B2 | * | 8/2008 | Menze et al. | 362/543 |
| 7,438,458 | B2 | * | 10/2008 | Menze et al. | 362/543 |
| 8,068,961 | B2 | * | 11/2011 | Menze | 701/49 |
| 2006/0123668 | A1 | * | 6/2006 | Campanella et al. | 37/268 |

* cited by examiner

Primary Examiner — Gary Hartmann
(74) Attorney, Agent, or Firm — Maier & Maier, PLLC

(57) ABSTRACT

A moldboard utility system enhances the features of a moldboard, or snowplow on a vehicle by integrating known vehicle components into different sections of the moldboard. Lighting, towing, and powering components commonly found on a vehicle are integrated into the moldboard. A moldboard lighting system includes headlights, turn signal lights, fog lights, spot lights, light emitting diodes, and emergency lights. The lights integrate directly into the various sections of the moldboard. For example, a headlight positions in a central section of the moldboard, directing an illumination onto the roadway. Turn signal lights attach to a pair of wings on the moldboard. The moldboard lighting system positions onto the moldboard in substantially the same elevation and orientation as vehicle lighting. A towing system integrates into the moldboard, enabling a tow line to attach to the moldboard or vehicle tow hook. A powering system integrates into the moldboard, providing access to power.

10 Claims, 8 Drawing Sheets

MOLDBOARD UTILITY SYSTEM

FIELD OF THE INVENTION

The present invention relates generally to a moldboard utility system. More so, the moldboard utility system integrates a lighting system, a towing system, and a powering system from a vehicle into a moldboard at generally the same elevation, orientation, and functionality provided by the vehicle.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that a moldboard, or plow, is a tool used to remove debris from the roadway, and also use in farming for initial cultivation of soil in preparation for sowing seed or planting to loosen or turn the soil. Plows can be attached to the front of a vehicle or drawn either by animals such as horses or camels or through a tractor. A plow may be made of wood, iron, or steel.

Typically, a vehicle lighting system consists of lighting and signaling devices mounted or integrated to the front, sides, rear, and in some cases the top of the motor vehicle. The purpose of this system is to provide illumination for the driver to operate the vehicle safely after dark, to increase the conspicuity of the vehicle, and to display information about the vehicle's presence, position, size, direction of travel, and driver's intentions regarding direction and speed of travel.

It is known that lighting positioned in proximity to a moldboard rests on a lighting stand. The lighting stand includes a rod that the lighting attaches to. The lighting stand extends the lighting to an elevation above the vehicle lighting. Due to the linear configuration of the light stand, instability and shaking may occur to the lighting during operation and driving, thereby causing the lighting to shake and misadjust. These undesirable effects may not optimize the illumination on the roadway.

Often, towing a vehicle from a vehicle having a connected moldboard requires connecting the tow line to the vehicle from behind the moldboard. This can create an awkward angle for towing. Connecting a jumper cable to a vehicle with a moldboard requires reaching around the moldboard to access the vehicle hood. This can be time consuming and dangerous.

Even though the above cited methods for providing vehicle lighting while attached to a moldboard address some of the needs of the market, a moldboard utility system that integrates vehicle lights, towing, and powering directly from the moldboard is still desired.

SUMMARY OF THE INVENTION

The present invention is directed to a moldboard utility system that enhances the features of a moldboard, or snowplow on a vehicle, by integrating known vehicle components and functions into different sections of the moldboard. The present invention integrates lighting, towing, and powering components found on a vehicle, and integrates them into the moldboard.

In one embodiment, a moldboard lighting system may be integrated into various sections of the moldboard, including a cutting edge, a central section, and a pair of wings. The moldboard lighting system comprises a variety of light signals that provide illumination for operation of the vehicle safely after dark, to increase the conspicuity of the vehicle, and to display information about the vehicle's presence, position, size, and direction of travel. The light signals may also help signal the vehicle's intentions regarding direction and speed of travel. Some examples of light signals used by the moldboard lighting system may include, without limitation, headlights, turn signal lights, fog lights, spot lights, light emitting diode directional bar lights, and emergency lights. These light include lights commonly found on a vehicle, and configured to integrate directly into the various sections of the moldboard. For example, without limitation, a headlight may position in a central section of the moldboard, directing an illumination onto the roadway. The headlight on the moldboard may, in essence replace the vehicle headlight when the moldboard is in a raised position. A pair of turn signal lights may attach to a pair of wings on the moldboard, being visible from the front, rear, and side of the vehicle. The vehicle turn signal light may operate in conjunction with the moldboard turn signal light.

In some embodiments, the moldboard lighting system incorporates into the moldboard in substantially the same elevation and orientation as the vehicle lighting system. In this manner, a more controlled, accurate illumination is directed onto a roadway, and the negative effects of vibrations are minimized. Those skilled in the art, will recognize that the prior art positioned the lighting system with moldboards and plows onto lighting stands that elevated above the moldboard and the vehicle lighting system. The lighting stands created substantial illumination problems, such as, an illumination that did not fully project onto the roadway, and instability during operation and driving that created vibrations and movements within the lighting system. The vibrations resulted in undesirable readjustments to the lighting system.

In some embodiments, the moldboard lighting system operates independently of the vehicle lighting system. The illumination from the vehicle lighting system is, in essence, replaced by the moldboard lighting system. The moldboard lighting system operates from a raised position, or the lowered position. Though some embodiments of the moldboard lighting system may be more effective in the raised position, the lowered position is also possible. Further, in some embodiments, the vehicle lighting system powers off from the raised position of the moldboard. From the raised position, the moldboard may rotate, swivel, and twist to direct the illumination to a desired area. The illumination from the raised position provides advantages due to the high vantage point for enhanced directional illumination. From the lowered position, the moldboard lighting system can also operate. In this manner, the vehicle lighting system remains attached to the vehicle and operational when the moldboard is lowered or covered with debris. The moldboard lighting system may further include dimmer lights, and controllable lighting systems that can be adapted to control the intensity of the illumination depending on the illumination requirements and operating position of the moldboard and the vehicle.

In some embodiments, a towing system may be integrated into the moldboard for enabling a tow line to attach to the moldboard, or preexisting tow hooks on the vehicle. The towing system may include a towing aperture with a cover that can be positioned at the moldboard or a pair of wings on the moldboard. The tow line may then be hooked onto a tow hook or tow bar inside the towing aperture or run straight to the preexisting tow hooks on the vehicle. In one embodiment, a locking fuel door or cap may be integrated into the moldboard at the same elevation and position where a tow ring would normally position on the vehicle. The tow line, or chain, may then pass through the fuel door, and attach to a tow hook, which serves as an anchor for one end of the tow line to hook onto. In some embodiments, the tow cable does not have to be attached behind the moldboard, which could create awkward angles for towing. However, in other embodiments, the tow cable attaches behind the moldboard, using the preexisting tow hooks on the vehicle or a tow hook attached behind the fuel door, such as a welded piece of metal that is formed to act as a tow assembly connection.

In some embodiments, a powering system may also be integrated into the moldboard for providing power directly from the vehicle via the moldboard. In this manner, the hood of the vehicle does not have to be opened and closed to access power from a vehicle battery. The powering system may include a powering aperture with a cover that can be positioned at the different sections of the moldboard and the moldboard wings. A pair of electrical terminals provides a positive and negative connection for a pair of jumper cables. In one embodiment, a cable may extend between the vehicle battery and a power aperture, with the appropriate terminals accessible through the power aperture. For example, the moldboard may include wiring and cables stopping short of the vehicle. The vehicle will have wires and cables stopping short of the moldboard. The wires may be integrated into a pin connector or similar whereas the cables have connectors. When the moldboard attaches to the vehicle, the wires and cables off the moldboard plug in or connect into the plug in and connectors from the vehicle.

In one embodiment, a locking fuel cap or door may be integrated into the moldboard at the same elevation and position where a vehicle battery would normally position on the vehicle. However, in other embodiments, any means may be used as a door or opening for passing the tow line or cable through. Those skilled in the art will recognize that the sole purpose for any form of door is to prevent snow and debris from going through and allow access to what is behind the door. The door may operate in various mechanisms, including, without limitation, magnetic, locking, sliding, and hinged.

In some embodiments, the cable hard wires directly from the vehicle to the fuel door such that a jumper cable may attach directly to the fuel door, rather than going through the circuitous route of opening the hood of the vehicle and connecting the cables to the vehicle battery. The jumper cables may connect to a positive and negative component or plug in adaptor behind the door. It is significant to note that the jumper cable is not attaching to the door itself; but rather, the door is only for access and while the door is closed, prevents snow from entering.

The powering system may also include power outlets that receive power from the vehicle battery, or a separate power source. In one alternative embodiment, at least one aperture in the moldboard may have the dual function of attaching to a tow cable, and providing power for a jumper cable. In yet another embodiment, the moldboard utility system may integrate audible signals and cameras into the moldboard to work in conjunction with the moldboard lighting system. The moldboard utility system may also integrate sirens, public announcement systems, image cameras, and video cameras into the moldboard.

A first aspect of the moldboard utility system provides a moldboard that integrates with lighting, towing, and powering components, the moldboard utility system comprising:
a moldboard, the moldboard being disposed to join with a vehicle, the moldboard being operable to move to a lowered position in relation to the vehicle, the moldboard further being operable to move to a raised position in relation to the vehicle;
a moldboard lighting system, the moldboard lighting system being disposed to integrate with the moldboard and the moldboard wings, the moldboard lighting system being configured to operate in conjunction with a vehicle lighting system, the moldboard lighting system further being configured to provide illumination from generally the same elevation and orientation as the vehicle lighting system;
a towing system, the towing system being disposed to integrate with the moldboard, the towing system being configured to join with a tow line; and
a powering system, the powering system being disposed to integrate with the moldboard and the moldboard wings, the powering system being configured to provide access to power from the vehicle.

In a second aspect, the moldboard lighting system enables safe operation of the vehicle in the dark, to increase the conspicuity of the vehicle, and to display information about the vehicle's presence, position, size, direction of travel, and vehicle's intentions regarding direction and speed of travel.

In another aspect, the moldboard lighting system provides illumination at the same elevation and orientation as the vehicle lighting system when the moldboard is in the raised position. The moldboard may then tilt and rotate to direct the illumination in a desired area.

In another aspect, the moldboard comprises at least one lighting aperture for receiving and encasing the lights. Then at least one lighting aperture may be welded out of a standard moldboard, with the circuitry joined at a rear end of the moldboard, between the vehicle and the moldboard.

In yet another aspect, the moldboard lighting system provides a substantial amount of illumination while the moldboard is in the raised position, and the vehicle lighting system provides a substantial amount of the illumination when the moldboard is in the lowered position. For example, at a vehicle accident scene where more illumination is needed, the moldboard can be lowered to take the weight off the frontal part of the vehicle.

In another aspect, a switch actuates the lighting system when the moldboard moves to the raised position. The switch powers off the moldboard lighting system when the moldboard moves to the lowered position.

In yet another aspect, the fog lights and the headlights integrate into the central section of the moldboard for providing illumination on the roadway directly in front of the vehicle. This may be useful while driving the vehicle, even when the moldboard is not in use.

In yet another aspect, the turn signal lighting and scene lighting integrate into the moldboard wings for providing side lighting and visibility to other vehicles.

In yet another aspect, the towing system positions on the moldboard wings to receive a pair of tow lines for symmetrical towing. The towing system may position on each wing, or from the moldboard.

In yet another aspect, the powering system connects directly with a vehicle battery. A cable provides a direct link from the vehicle battery to a powering aperture in the moldboard or moldboard wings to provide access to power for a jumper cable that attaches to a pair of electrical terminals in the powering aperture.

In one objective of the present invention, the moldboard utility system provides illumination for the vehicle when the moldboard is in the raised position and operating. This creates illumination that, in essence replaces the vehicle lighting system without replacing the illuminating effects. The vibrations and consequences thereof are minimized by integrating the lighting into the moldboard, rather than on a light stand above the vehicle and vehicle lighting system.

In another objective, the moldboard lighting system may join with any type of moldboard or snow plow with minimal tools, labor, and expense.

In another objective, the moldboard lighting system detaches from the moldboard quickly, without the use of heavy or expensive tools.

These and other advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, in which:

FIG. 1A illustrates a vehicle lighting system attached above a moldboard, and FIG. 1B illustrates a moldboard joined to a vehicle with a vehicle light stand supporting a vehicle lighting system, in accordance with an embodiment of the present invention;

FIG. 3A illustrates an exemplary headlight, FIG. 3B illustrates an exemplary turn signal light, FIG. 3C illustrates an exemplary light emitting diode directional bar light, and FIG. 3D illustrates an exemplary fog light, in accordance with an embodiment of the present invention;

FIG. 5A illustrates a frontal view, and FIG. 5B illustrates a perspective view form a top angle, in accordance with an embodiment of the present invention;

Like reference numerals refer to like parts throughout the various views of the drawings.

DETAILED DESCRIPTION OF THE INVENTION

Figure 1A:
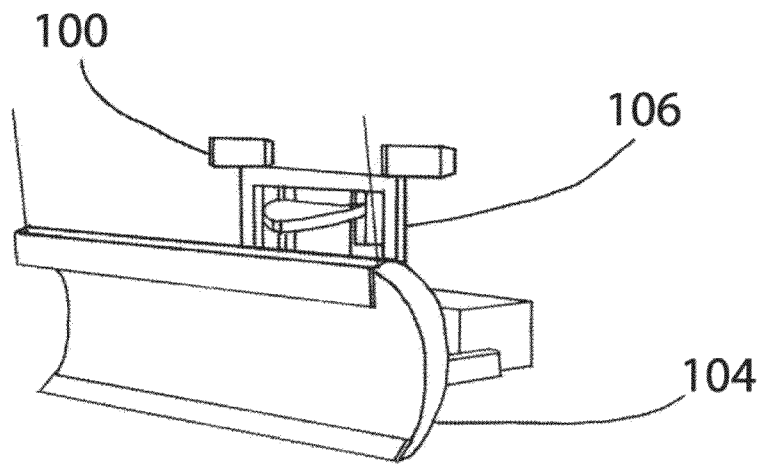
FIGS. 1A and 1B illustrate detailed perspective views of prior art lighting systems positioned on exemplary lighting stands and elevated above an exemplary vehicle lighting system, where

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIGS. 1A and 1B. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At the outset, it should be clearly understood that like reference numerals are intended to identify the same structural elements, portions, or surfaces consistently throughout the several drawing figures, as may be further described or explained by the entire written specification of which this detailed description is an integral part. The drawings are intended to be read together with the specification and are to be construed as a portion of the entire "written description" of this invention as required by 35 U.S.C. § 112.

FIGS. 1A through 6C illustrate exemplary embodiments of a moldboard utility system 200.

In one embodiment of the present invention, the moldboard utility system 200 integrates a moldboard lighting system 202 into a moldboard 104 at substantially the same elevation and orientation as a vehicle lighting system 100. The moldboard utility system 200 also includes a towing system 500 for providing access to a tow line 506, and a powering system 600 for providing access to power from a vehicle battery 608.

The moldboard lighting system 202 operates independently of the vehicle lighting system 100. The illumination from the vehicle lighting system 100 is, in essence, replaced by the moldboard lighting system 202. In one embodiment, the moldboard lighting system 202 operates from a raised position, while the vehicle lighting system 100 powers off from the raised position of the moldboard 104. However in other embodiments, the moldboard lighting system 202 and the vehicle lighting system 100 power on simultaneously. From the raised position, the moldboard 104 may rotate, swivel, and twist to direct the illumination from the moldboard lighting system 202 to a desired area. The illumination from the raised position provides advantages due to the high vantage point for enhanced directional illumination. From the lowered position, the moldboard lighting system 202 may or may not operate, depending on the requirements. When the moldboard lighting system 202 is not operating though, the vehicle lighting system 100 remains attached to a vehicle 102 and operational when the moldboard 104 is lowered or covered with debris. The moldboard lighting system 202 may further include dimmer lights, and controllable lighting systems that can be adapted to control the intensity of the illumination depending on the illumination requirements and operating position of the moldboard 104 and the vehicle 102.

In some embodiments, the moldboard lighting system 202 may be integrated into various sections of the moldboard 104, such as a cutting edge, a central section, and a pair of wings. The moldboard 104 may be attached to a vehicle 102 during operation of the moldboard lighting system 202. In some embodiments, the moldboard lighting system 202 directs illumination from any direction on the moldboard 104, including, directly in front of the vehicle 102, to the sides of the vehicle 102, and illumination onto the vehicle 102 and behind the moldboard 104. The moldboard 104 may tilt, rotate, or swivel to direct the moldboard lighting system 202 to a desired area. The moldboard 104 may include, without limitation, a straight plow, a V-plow, a snow plow, a moldboard plow, a loy plow, a turnwrest plow, a reversible plow, a chisel plow, a spade plow, a paraplow, and any broad surfaced plane configured to attach to a vehicle 102 and manipulate and remove debris.

Figure 1B:
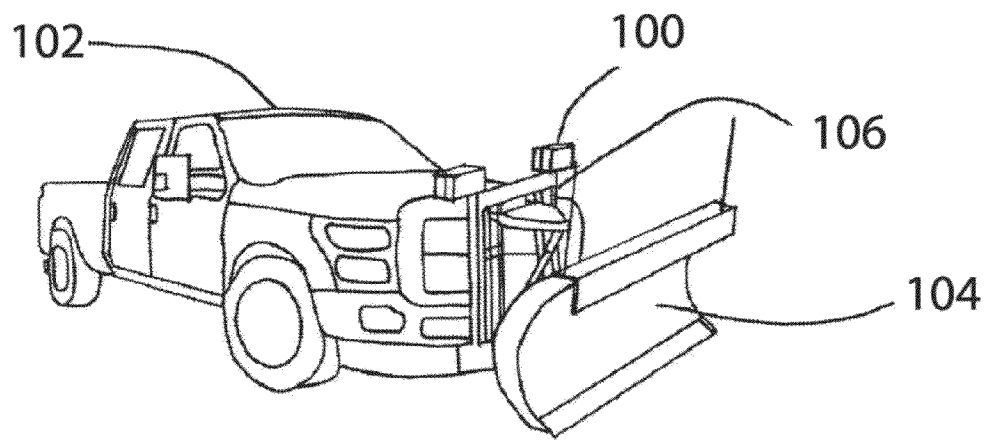

As referenced in FIGS. 1A and 1B, the prior art attached a vehicle lighting system 100 directly onto the vehicle 102 in an unobstructed position around the moldboard 104. In one embodiment, the prior art positioned the vehicle lighting system 100 onto a vehicle light stand 106 that elevated above the moldboard 104. The vehicle light stand 106 created substantial illumination problems. For example, without limitation, in low light settings or absolute darkness the elevated position of the vehicle lighting system 100 resulted in a lack of illumination. Additionally, the vehicle light stand 106 may comprise a linear pole that subject to movement and vibrations while the vehicle 102 or the moldboard 104 were in operation (FIG. 1A). This created instability in the vehicle lighting system 100, which further degraded the efficiency of the illumination.

Figure 2:
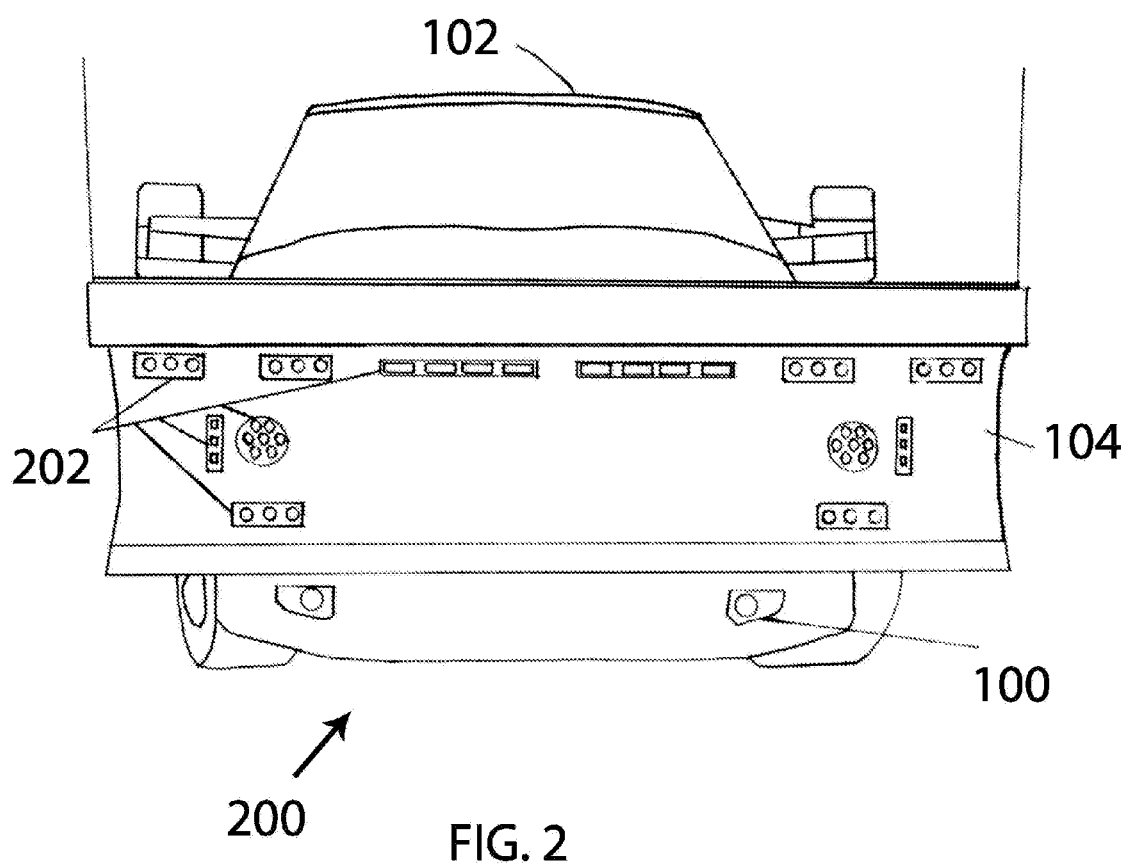
FIG. 2 illustrates a frontal view of an exemplary moldboard utility system having a moldboard lighting system positioned at generally the same elevation and orientation as a vehicle lighting system behind the moldboard, in accordance with an embodiment of the present invention.

The present invention, as referenced in FIG. 2, enables a moldboard lighting system 202 to integrate into the moldboard 104. The moldboard lighting system 202 may include, without limitation, headlights, turn signal lights, fog lights, spot lights, scene lights, light emitting diode directional bar lights, and emergency lights. These lights may be common lights found on the vehicle 102, and configured to integrate directly into the various sections of the moldboard 104. For example, without limitation, a headlight and a fog light position in a central section of the moldboard 104. The central positioning of the headlight and the fog light creates direct illumination onto the roadway, in front of the vehicle 102. However, the headlight and fog lights may position on any section on the moldboard 104 or pair of wings. Additionally, a scene light and a pair of turn signal lights can attach to a pair of wings on the moldboard 104, being visible from the front, side and rear of the vehicle 102. In this manner, a vehicle turn signal light may operate in conjunction with the moldboard turn signal light, and the scene light may direct illumination towards a side projection from the moldboard 104.

The moldboard lighting system 202 may work in conjunction with the vehicle lighting system 100. The moldboard lighting system 202 may be coordinated to operate the light signals that are not visible from the vehicle 102 due to the presence of the moldboard 104. In some embodiments, all or some of the vehicle lighting system 100 may be disabled, with the illumination functions replaced by the moldboard lighting system 202. For example, without limitation, when the moldboard 104 is in a raised position, the moldboard headlights and fog lights operate, while the vehicle headlights, which is blocked by the moldboard 104, powers off. Additionally, the turn signals for both the moldboard lighting system 202, the wings, and the vehicle lighting system 100 can operate together. Nonetheless, the vehicle lighting system 100 may remain attached to the vehicle 102 and operational while the moldboard 104 is in a lowered position, or covered with debris. Though in some embodiments, any combination of lights may be operable no matter the position of the moldboard 104.

The moldboard lighting system 202 utilizes a variety of light signals that are efficacious for providing illumination for operation of the vehicle 102 safely after dark, to increase the conspicuity of the vehicle 102, and to display information about the vehicle's 102 presence, position, size, direction of travel. The light signals also convey the vehicle's 102 intentions regarding direction and speed of travel. The moldboard lighting system 202 may generate illumination with the light signals while the moldboard 104 is operational, disabled, in a lowered position, and in a raised position. In one embodiment, referenced in FIG. 3A, a headlight 302 positions in the central section of the moldboard 104. The headlight 302 provides the primary illumination that allows the vehicle 102 to safely drive at night or in reduced visibility. The headlight 302 may include a high beam and a low beam. Those skilled in the art will recognize that the headlights 302 that are integrated into the moldboard 104 require accurate calibrating to ensure the direction and intensity of the illumination reaches the optimal amount of roadway in front of the vehicle 102 for driving of the vehicle 102 and operation of the moldboard 104.

Figure 3A:
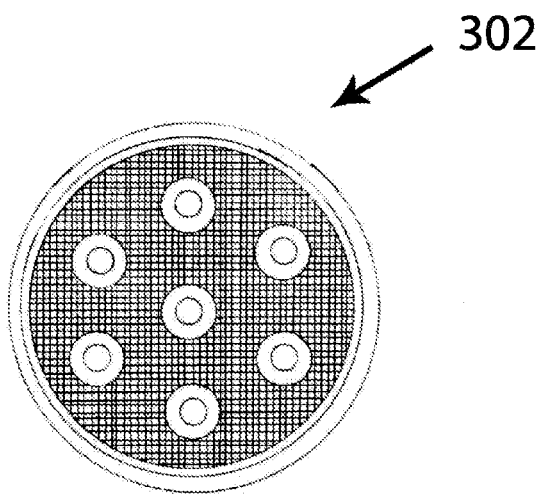
FIGS. 3A, 3B, 3C, and 3D illustrate detailed perspective views of various types of light signals utilized in the moldboard lighting system, where
Figure 3B:
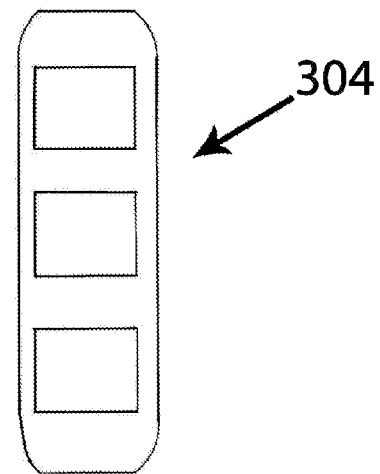
Figure 3C:
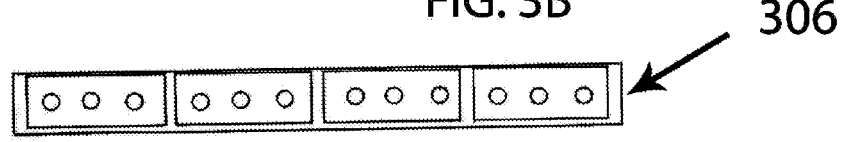
Figure 3D:
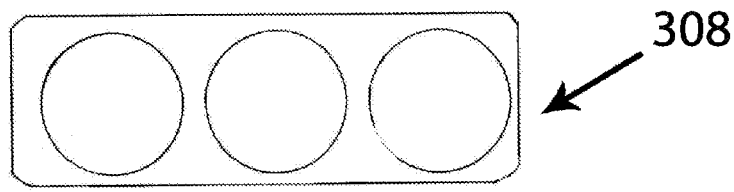

FIG. 3B illustrates a turn signal 304. The turn signal 304 gives oncoming traffic and pedestrians a visual aid to know which direction the vehicle 102 is turning. Often a pair of turn signals 304 position on the wings of the moldboard 104, working in conjunction with vehicle turn signals. However, in other embodiments, the pair of turn signal lights 304 can position anywhere on a periphery of the moldboard 104. Additionally, the pair of turn signals 304 may be connected in parallel, such that when one turn signal 304 operates, the other turn signal 304 also operates. FIG. 3C shows a light emitting diode directional bar signal 306 that may position on a top, peripheral section of the moldboard 104. The light emitting diode directional bar signal 306 can illuminate in a variety of different colored flashing lights, including amber, which is useful for emergency situations. A fog light 308 is illustrated in FIG. 3D. The fog light 308 may be utilized on the moldboard 104 during restricted visibility or to enhance a wider field of vision while driving. The fog light 308 is efficacious for creating a flood light effect for illuminating a large area, or a more narrow illumination to highlight a smaller area.

Additional light signals that integrate with the mold board may include a scene light that specifically focuses on an area being worked, including, without limitation, a driveway, a yard, a crime scene, motor vehicle accident, the vehicle 102, and the moldboard 104. The scene light may provide illumination in various colors, and from the pair of wings of the moldboard 104. The scene light can also be utilized to illuminate the moldboard utility system 200 and the vehicle 102. A spot light can also be integrated into the moldboard 104, or on the vehicle 102 to provide specific lighting. In other embodiments, emergency lighting may be integrated into the moldboard 104. The emergency lighting may include, without limitation, wig wag flashers, hideaways, grill lights/deck lights, dash lights, and light bars. In some embodiments, various circuitries join the light signals to a power source, and interconnect the various light signals. The circuitry may include, without limitation, wires, spliced wired, wire connectors, 2-pin connectors, single dimmer switches, and dual dimmer switches. The 2-pin connectors enable facilitated connecting/disconnecting for each individual light signal, as desired. However in other embodiments, more than 2 pins for the connector may be utilized.

Figure 4:
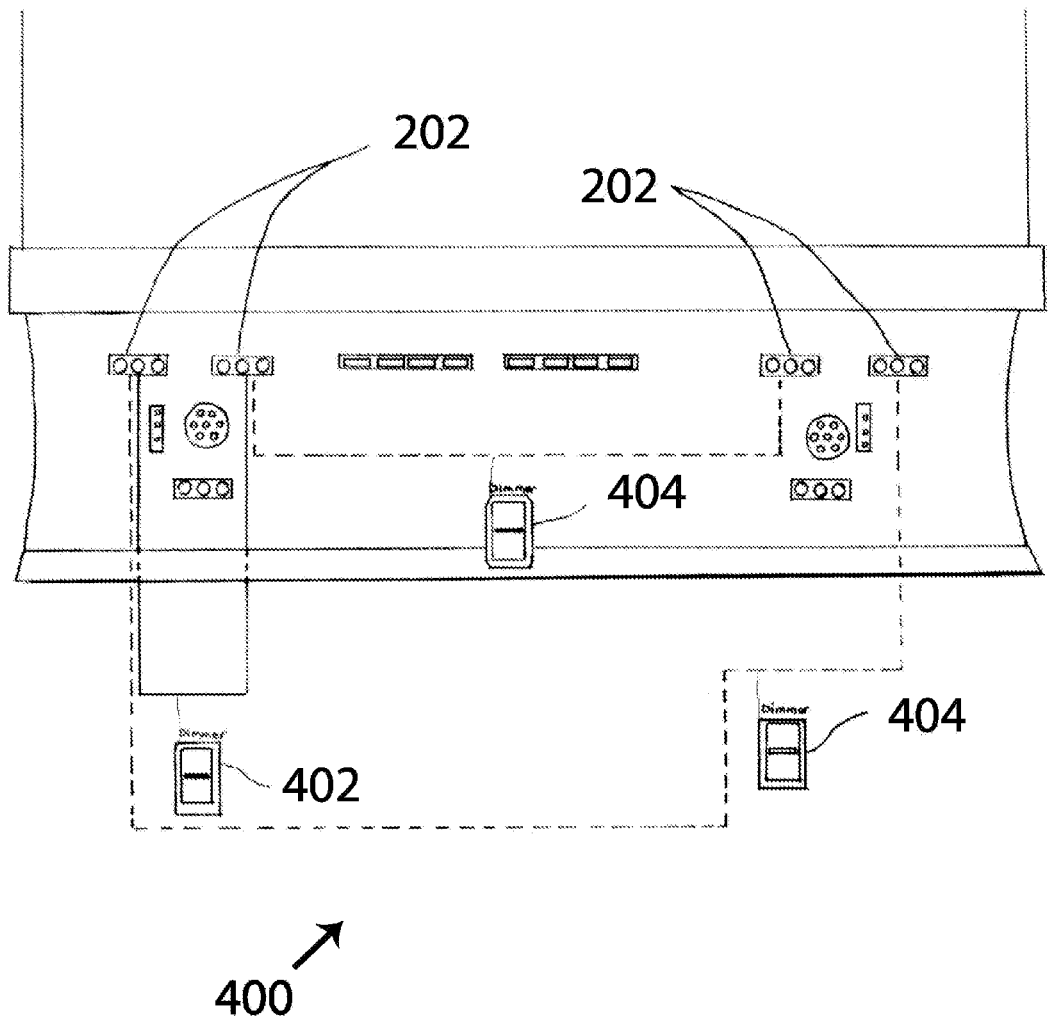
FIG. 4 illustrates a diagram of exemplary dimmer switches regulating an exemplary moldboard lighting system, in accordance with an embodiment of the present invention.

Turning now to FIG. 4, the moldboard lighting system 202 may further include dimmer switches 402, 404, and controllable lighting systems that can be adapted to control the intensity of the illumination depending on the illumination requirements and operating position of the moldboard 104 and the vehicle 102. The dimmer switches provide flexibility for the use of the moldboard lighting system 202, depending on the circumstances and operational requirements. For example, without limitation, the dimmer switches 402, 404 enables the moldboard lighting system 202 to operate all of the individual light signals at a lower brightness, or set one of the light signals brighter than the other light signals, and still have a 180° field of view. The brightness may also be reduced so as not to shine too brightly in to homes and businesses. FIG. 4 illustrates a dimmer lighting diagram 400 in which a single dimmer switch 402 enables adjustment of the brightness for the flood light and the scene light. A dual dimmer switch 404 may be utilized to regulate additional lights. In some embodiments, more than one of each light may be operatively connected to different dimmer switches 402, 404.

Figure 7:
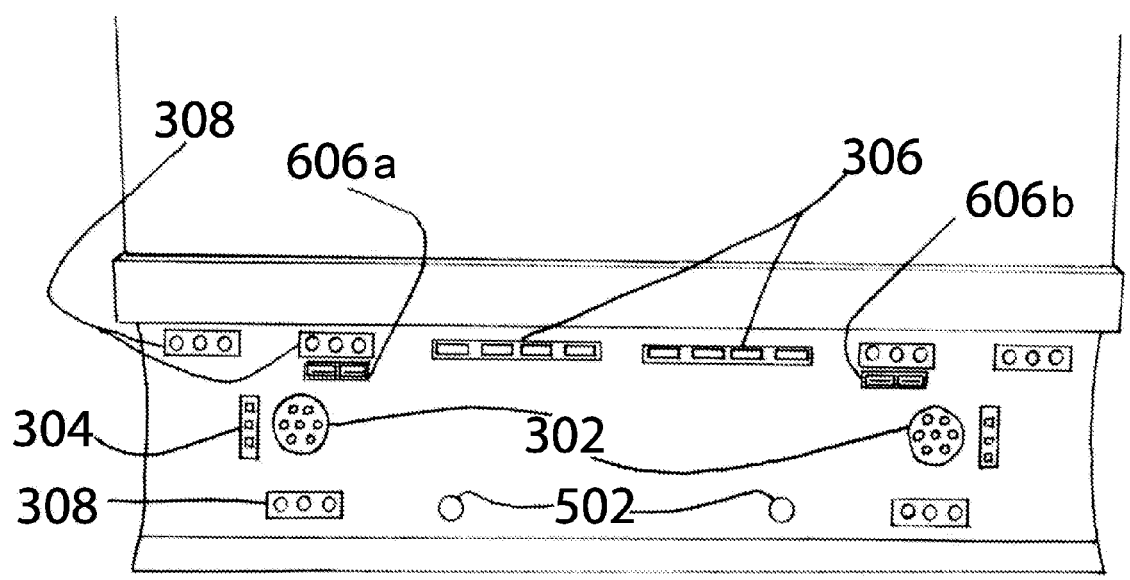
FIG. 7 illustrates a frontal view of an exemplary moldboard having a plurality of lighting systems and power outlets, in accordance with an embodiment of the present invention.

As referenced in FIG. 7, the moldboard lighting system 202 may be installed into the moldboard by cutting a lighting aperture into the moldboard 104 at the desired position, and fitting the appropriate light thereto. Fasteners may be used to secure the light into the moldboard 104. Fasteners may include, without limitation, screws, bolts, welding, magnets, friction, and wire. A circuitry located between the vehicle 102 and the moldboard 104 may join the moldboard lighting system 202 to a vehicle battery 608 or an external moldboard power source. In this manner, each individual light may be directionally adjusted while integrated into the moldboard 104. In some embodiments, the moldboard lighting system 202 positions onto the moldboard 104 in substantially the same elevation and orientation as the vehicle lighting system 100. In this manner, a more controlled, accurate illumination is directed onto a roadway, and the negative effects of vibrations are minimized. For example, without limitation, the headlights 302 in the moldboard 104 position in a central section of the moldboard 104, in substantially the same elevation as the vehicle headlights. The moldboard headlights 302 may then project the illumination directly onto the roadway, such that the vehicle 102 receives the same guidance from either the moldboard headlight 302, or the vehicle headlight. It is significant to note that the moldboard 104 would be in a lowered position, and in operation for the moldboard headlight 302 to provide the desired illumination in this example.

Figure 5A:
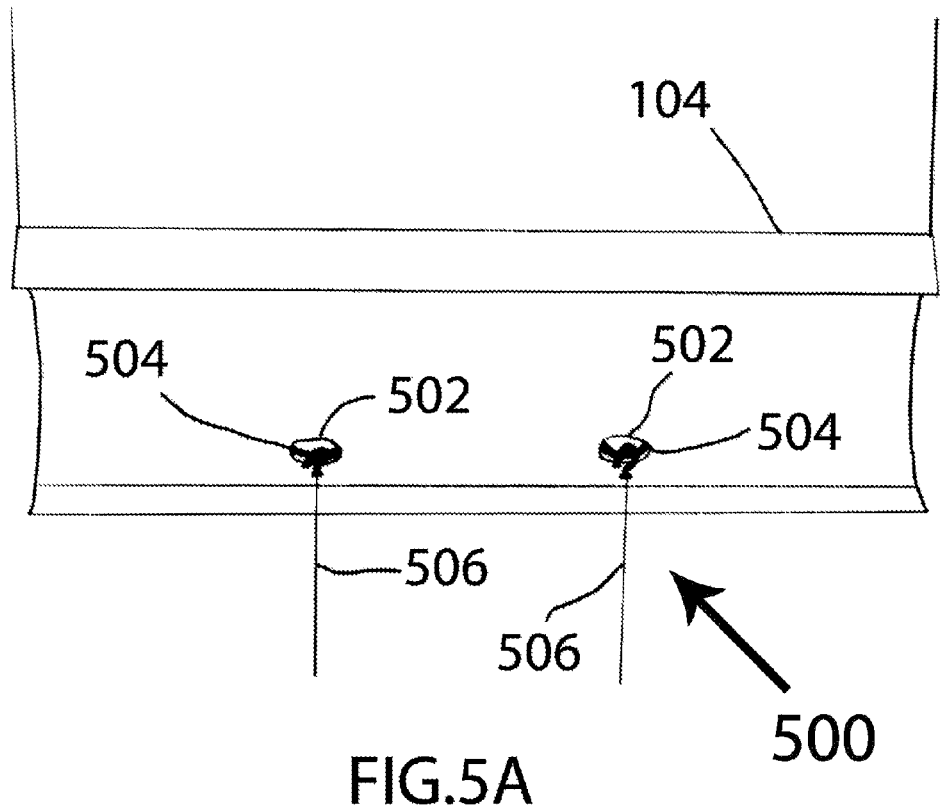
FIGS. 5A and 5B illustrate detailed perspective views of an exemplary towing system integrated into an exemplary moldboard with a towing aperture joined to a tow line, where
Figure 5B:
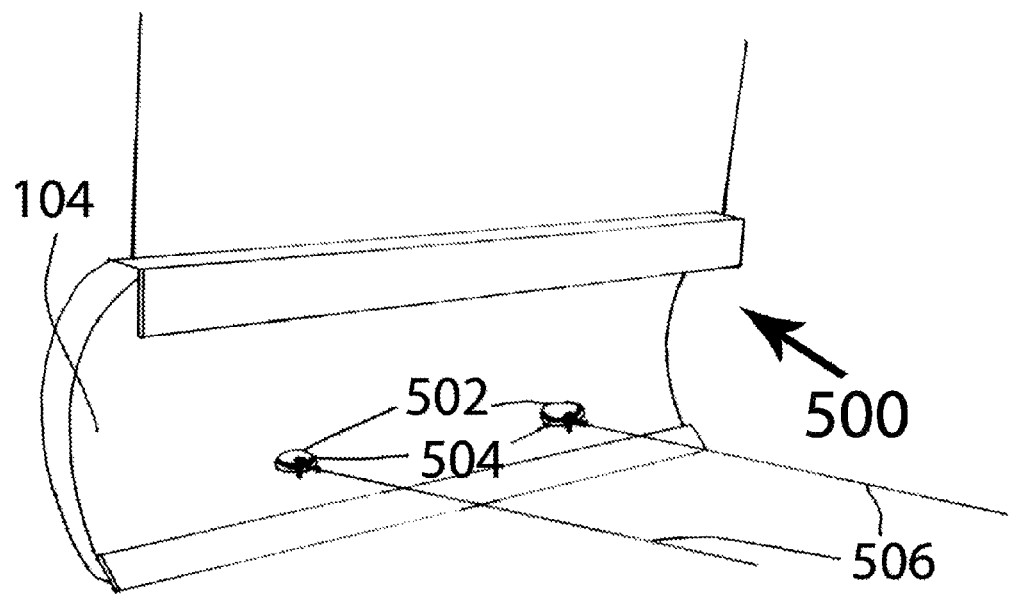

Turning now to FIGS. 5A and 5B, a towing system 500 may be integrated into the moldboard 104 for enabling a tow line 506 to attach to a support member 504 that joins with the moldboard 104. The tow line 506 may include, without limitation, a chain, a bungee cable, a rope, and a rod. The towing system 500 may include a towing aperture 502 with a cover that can be positioned at the moldboard 104 or the pair of wings. The tow line 506 may then be hooked onto the support member 504, such as a bar that positions inside the towing aperture 502. In one embodiment, a locking fuel door may be integrated into the moldboard 104 at the same elevation and position where a tow ring would normally position on the vehicle 102. The tow line 506 may then pass through and around the fuel door, which serves as an anchor for one end of the tow line 506 to hook on to. In this manner, the tow line 506 does not have to be attached behind the moldboard 104, which could create awkward angles for towing. Rather, the tow line 506 has a clear access point to join to the front of the moldboard 104, or straight to the pre-existing tow hooks.

Figure 6:
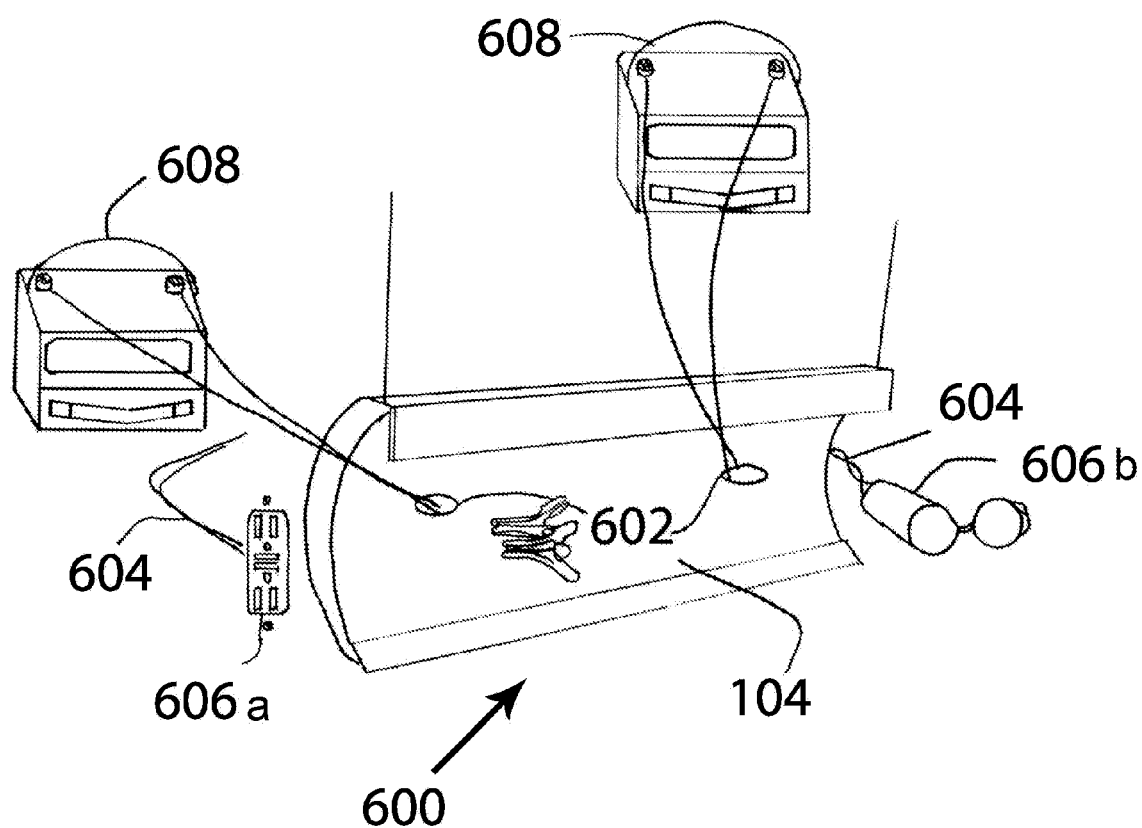
FIG. 6 illustrates a detailed perspective view of an exemplary powering system integrated into an exemplary moldboard, with a vehicle battery providing power to an electrical cable and various electrical sockets integrated into powering apertures in the moldboard, in accordance with an embodiment of the present invention.

Turning now to FIG. 6, a powering system 600 may also be integrated into the moldboard 104 for providing power directly from the vehicle 102 via the moldboard 104. In this manner, the hood of the vehicle 102 does not have to be opened and closed to access power from the vehicle battery 608. The powering system 600 may include a powering aperture 602 with a cover that can be positioned at the moldboard or the pair of wings. A pair of electrical terminals provides a positive and negative connection for a pair of jumper cables. A cable 604 may position between the vehicle battery 608 and the powering aperture 602, with the appropriate terminals accessible through the powering aperture 602. In one embodiment, a locking fuel door may be integrated into the moldboard 104 at the same elevation and position where the vehicle battery 608 would normally position on the vehicle 102 (FIG. 7). The cable 604 hard wires directly from the vehicle battery 608 to the fuel door such that the jumper cable may attach directly to the fuel door, rather than going through the circuitous route of opening the hood of the vehicle 102 and connecting the cables to the vehicle battery 608. However in other embodiments, adding a positive and negative terminal directly onto the fuel door is possible. Otherwise, the fuel door simply regulates access for the jumper cable plug in.

Figure 8:
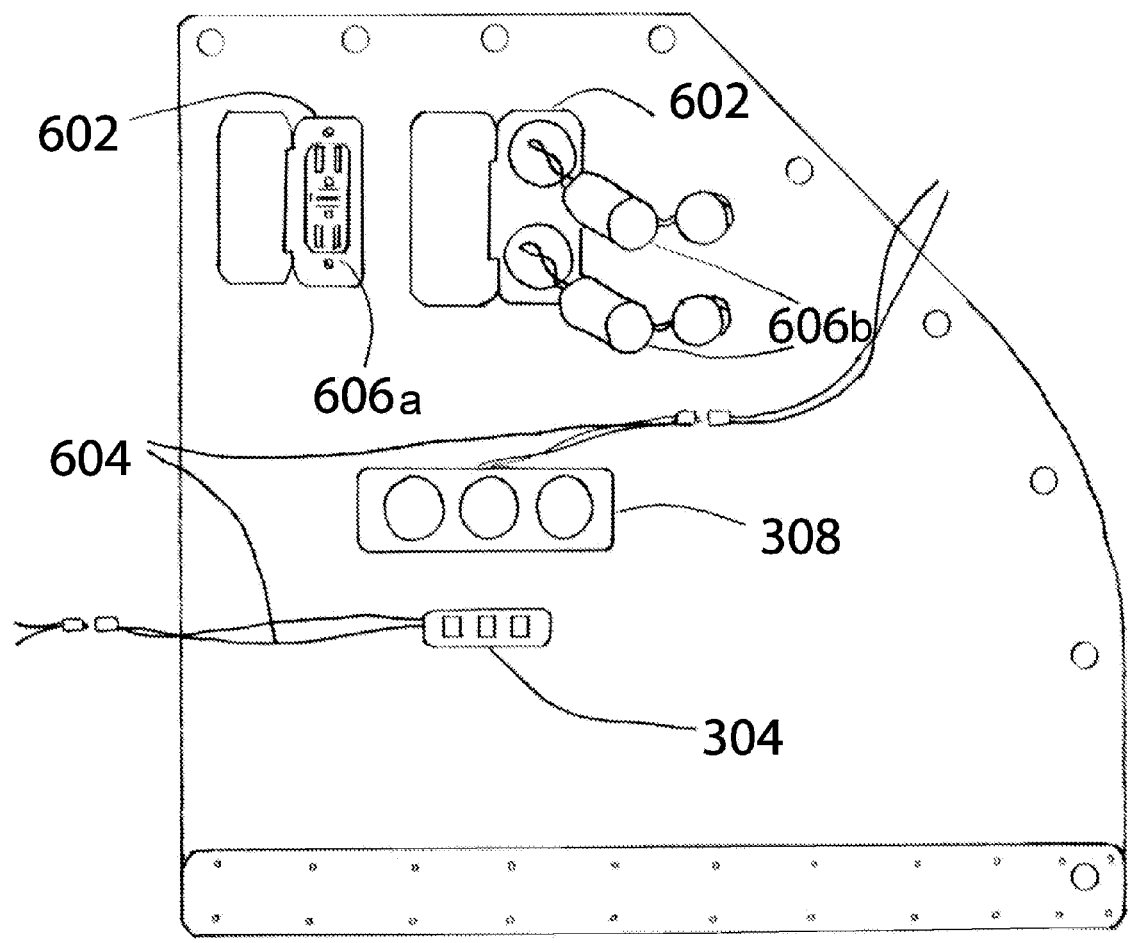
FIG. 8 illustrates a side view of an exemplary moldboard wing having a powering system, in accordance with an embodiment of the present invention.

As referenced in FIG. 8, the powering system 600 may integrate at least one power outlet 606a, 606b into the moldboard 104 to provide access to power from the vehicle, and more specifically, the vehicle battery 608. However, in other embodiments, then at least one power outlet 606a may receive power from a separate external power source. In some embodiments, then at least one power outlet 606a may include a socket, such as an outdoor GFCI power outlet that attaches to the pair of wings. A pair of 12 volt sockets may also be integrated into the moldboard. Additional electrical components that may be integrated into the moldboard may include, without limitation, a USB/Outlet combo charger, a duplex Outlet, a GFCI Outlet, and an electrical outlet.

In one embodiment, a diffusion scene light may position in proximity to the powering system 600 to provide illumination for the powering system 600. This illumination facilitates access to the powering aperture 602 and then at least one power outlet 606a. The circuitry behind the scene light and then at least one power outlet 606a may include spliced wires and 2-pin connectors for enabling facilitated disablement of the powering system 600 and the moldboard lighting system 202 as desired. In one alternative embodiment, at least one aperture in the moldboard 104 may have the dual function of attaching to the tow line 506, and providing access to power for the jumper cable and then at least one power outlet 606a.

In some embodiments, the moldboard utility system 200 may integrate an audio system for generating audible signals that work in conjunction with the moldboard lighting system 202. The audible signals may include, without limitation, siren, a public address system, a vehicle horn, and an outdoor music system. For example, without limitation, during a snow storm, the moldboard 104 removes snow from the roadway with the help of illumination from a fog light, while voice recordings emit from the audio system alerting about adverse weather. In yet another embodiment, the moldboard utility system 200 may include at least one camera for capturing images to record work progress or provide security features. The image from the cameras may be viewed from the vehicle 102, or a remote location.

In one alternative embodiment, the moldboard lighting system 202 may have its own power source, including, without limitation, a moldboard battery, a solar panel, and an exterior power source that joins with the moldboard 104 through an exterior power cable. In yet another alternative embodiment, the moldboard utility system 202 may be utilized on a rear end of the vehicle 102, and on the wings of the moldboard 104. In yet another alternative embodiment, the towing system 500 may include an automated winch for reeling in the tow line 506. In yet another alternative embodiment, the moldboard lighting system 202 may attach to the moldboard with magnets, and each light may have its own individual power source.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What I claim is:

1. A moldboard utility system for integrating lighting, towing, and powering components into a moldboard, the system comprising:
    a moldboard, the moldboard being disposed to join with a front of a vehicle, the moldboard being operable to move to a lowered position in relation to the vehicle, the moldboard further being operable to move to a raised position in relation to the vehicle, wherein the moldboard comprises a snow plow having a central section, a cutting edge, and a pair of wings;
    a moldboard lighting system, the moldboard lighting system being integrated with the moldboard, the moldboard lighting system being configured to operate in conjunction with a vehicle lighting system, the moldboard lighting system further being configured to provide illumination from the lowered position and/or the raised position wherein the moldboard lighting system comprises at least one of headlights, turn signal lights, emergency lights, fog lights, scene lights, and flood lights integrated into at least one of the central section, cutting edge, and pair of wings of the moldboard;
    a towing system, the towing system being disposed to integrate with the moldboard, the towing system being configured to join with a tow line wherein the towing system comprises a towing aperture integrated into the moldboard, a support member within the aperture configured to attach one end of a tow line, and a cover; and
    a powering system, the powering system being disposed to integrate with the moldboard, the powering system being configured to provide access to power from the vehicle.

2. The system of claim 1, wherein the moldboard lighting system is configured to pass through at least one lighting aperture in the moldboard.

3. The system of claim 2, wherein the moldboard lighting system comprises at least one of a single dimmer switch and a dual dimmer switch for adjusting the brightness of the illumination.

4. The system of claim 3, wherein the vehicle lighting system comprises a flood light attached to a pre-existing light stand.

5. The system of claim 1, wherein the towing system comprises a locking fuel door welded the moldboard.

6. The system of claim 5, wherein the powering system receives power from a vehicle battery through a cable.

7. The system of claim 6, wherein the powering system comprises a powering aperture and a pair of electrical terminals for attaching to a jumper cable for providing power.

8. The system of claim 7, wherein the powering system comprises at least one power source.

9. The system of claim 8, wherein the powering system comprises a locking fuel cap/door welded into at least one of the pair of wings and the central section of the moldboard.

10. A moldboard utility system that integrates lighting, towing, and powering components into a moldboard, the system comprising:
    a moldboard, the moldboard comprising a snow plow having a central section, and a cutting edge, and a pair of wings, the moldboard being disposed to join with a front of a vehicle, the moldboard being operable to move to a lowered position in relation to the vehicle, the moldboard further being operable to move to a raised position in relation to the vehicle;
    a moldboard lighting system, the moldboard lighting system being integrated into the moldboard, the moldboard lighting system being configured to operate in conjunction with a vehicle lighting system, the moldboard lighting system further being configured to provide illumination from generally the same elevation and orientation as the vehicle lighting system while in the lowered position and/or the raised position, the moldboard lighting system further comprising at least one of headlights, turn signal lights, emergency lights, fog lights, scene lights, flood lights, the moldboard lighting system being configured to pass through at least one lighting aperture in the moldboard, the moldboard lighting system further comprising a dimmer for adjusting the intensity of the illumination;
    a towing system, the towing system being integrated into the moldboard, the towing system being configured to join with a tow line, the towing system comprising a towing aperture and a cover, the towing aperture being configured to receive the tow line;
    a powering system, the powering system being disposed to integrate into the moldboard, the powering system being configured to provide access to power from the vehicle, the powering system comprising a powering aperture and a pair of electrical terminals, the pair of electrical terminals being configured to attach to a jumper cable for providing power;
    an audio system for generating audible signals in coordination with the moldboard lighting system; and
    at least one camera for capturing an image in proximity to the moldboard for recording operations and providing security.

* * * * *